B. F. Joslyn,
Nut Wrench.

N° 16,733.  Patented Mar. 3, 1857.

Witnesses.
John P. Marshall
Lewis Thayer

Inventor
B. F. Joslyn

UNITED STATES PATENT OFFICE.

B. F. JOSLYN, OF WORCESTER, MASSACHUSETTS.

SCREW-WRENCH.

Specification of Letters Patent No. 16,733, dated March 3, 1857.

*To all whom it may concern:*

Be it known that I, B. F. JOSLYN, of the city and county of Worcester and State of Massachusetts, have invented a new Improvement in Screw-Wrenches; and I do hereby declare that the following is a full and exact description thereof, reference being had to the annexed drawings, and to the letters of reference marked thereon, making a part of this specification, in which—

Figure 1:
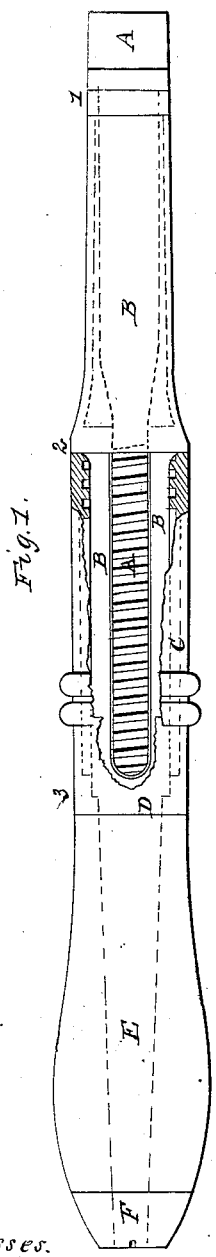
Figure 2:
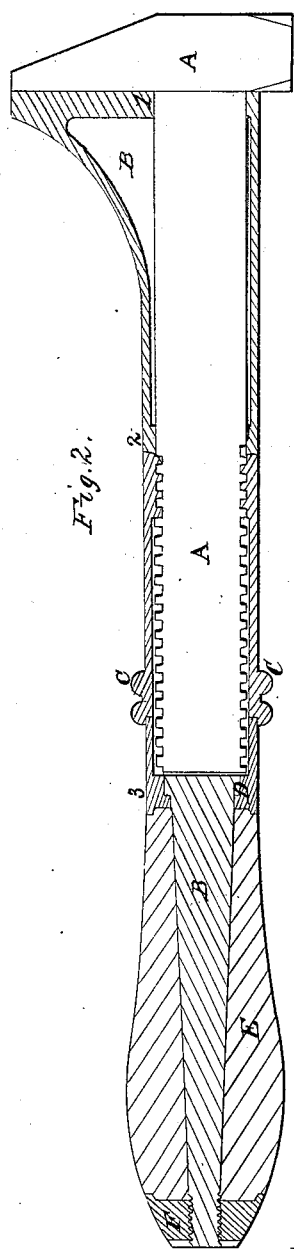

Figure 1, is an edge view with part of the nut and ferrule removed; and Fig. 2, a side sectional view of the same.

The nature of my improvement (on screw wrenches which have a movable hammer-shank, in a stationary jaw that extends back on which to form a handle; both parts being surrounded with a nut by which to operate the movable shank) consists in making the part under the nut in which is the movable shank, with only two sides; thereby allowing the hammer-shank to have a thread on both edges fitting into the corresponding thread in the nut; it being and operating better than the one of three sides under the nut, allowing a thread only on one edge of the shank fitting into the nut as is in my former wrench which was patented July 10th, 1855.

To enable others skilled in the art to make and use my invention I will proceed to describe its construction and operation.

A, is the hammer and its shank having a thread on both edges from 2 to 3; B, the main part of the wrench having four sides and inclosing perfectly the hammer-shank from 1 to 2 and from 2 to 3 only two sides, and smaller, thereby allowing both edges of the hammer-shank to project the depth of the screw or thread so as to fit into the thread in the nut C, which incloses both parts from 2 to 3.

D, is a ring fitting on the part B, at 3 projecting into and making a bearing for the nut C, also a ferrule for the handle E, which covers the stem of the part B, from 3 to the tip nut F, which is screwed on to hold the handle; ferrule; and nut, all in their place as shown in the drawing.

To operate, after all parts are made and put together as shown and described; turn the nut C, to the left and the hammer with shank will move out with ease, the distance the shank screws into the nut; thereby making a good and substantial wrench, for a nut with sides nearly as long as the nut C, then turn the nut to the right and it will close the wrench as it is shown in the drawing; in which shape it may be used for a hammer.

What I claim and desire to secure by Letters Patent, is—

A hammer-shank with a thread on both edges fitting into a nut when combined with the other parts of the wrench arranged as shown and described.

B. F. JOSLYN.

Witnesses:
JOHN P. MARSHALL,
LEWIS THAYER.